(12) United States Patent
Yang et al.

(10) Patent No.: US 10,558,511 B2
(45) Date of Patent: Feb. 11, 2020

(54) METHOD AND DEVICE FOR EVALUATING SYSTEM FLUENCY, AND UE

(71) Applicant: Beijing Xiaomi Mobile Software Co., Ltd., Beijing (CN)

(72) Inventors: Dongdong Yang, Beijing (CN); Rui Xie, Beijing (CN); Hui Du, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 170 days.

(21) Appl. No.: 15/793,128

(22) Filed: Oct. 25, 2017

(65) Prior Publication Data

US 2018/0121279 A1 May 3, 2018

(30) Foreign Application Priority Data

Oct. 27, 2016 (CN) .......................... 2016 1 0959975

(51) Int. Cl.
*G06F 11/07* (2006.01)
*G06F 11/30* (2006.01)
(Continued)

(52) U.S. Cl.
CPC ...... *G06F 11/0751* (2013.01); *G06F 11/0781* (2013.01); *G06F 11/302* (2013.01); (Continued)

(58) Field of Classification Search
CPC ............. G06F 11/0751; G06F 11/0781; G06F 11/3013; G06F 11/302; G06F 11/3093; (Continued)

(56) References Cited

U.S. PATENT DOCUMENTS 8,296,445 B1 * 10/2012 Hackborn ........... G06F 11/3664
709/228
8,533,842 B1 * 9/2013 Satish ..................... H04L 63/20
726/22
(Continued)

FOREIGN PATENT DOCUMENTS

CN 105320584 A 2/2016
CN 105446845 A 3/2016

OTHER PUBLICATIONS

Combined Office Action and Search Report dated Aug. 20, 2018 in Chinese Patent Application No. 201610959975.6, (with English translation), 24 pages.
(Continued)

*Primary Examiner* — Yolanda L Wilson
(74) *Attorney, Agent, or Firm* — Oblon, McClelland, Maier & Neustadt, L.L.P.

(57) ABSTRACT

The disclosure relates to a method and device for evaluating system fluency. The method includes monitoring an operational state of a service in a serialized scenario on a system, wherein the serialized scenario simulates a usage habit of a user, and includes at least one third-party application; detecting at least one abnormality during the operational state of the service; determining a number of occurrences of each one of the detected abnormalities; and computing a fluency score of the system based on the number of occurrences of each one of the detected abnormalities.

20 Claims, 6 Drawing Sheets

(51) Int. Cl.
*G06F 11/34* (2006.01)
*G06F 11/36* (2006.01)

(52) U.S. Cl.
CPC ...... *G06F 11/3013* (2013.01); *G06F 11/3093* (2013.01); *G06F 11/3457* (2013.01); *G06F 11/3604* (2013.01)

(58) Field of Classification Search
CPC . G06F 11/2457; G06F 11/3604; G06F 11/079
See application file for complete search history.

(56) References Cited

U.S. PATENT DOCUMENTS

| | | | |
|---|---|---|---|
| 2005/0261859 A1 | 11/2005 | Petsinger | |
| 2007/0160971 A1 | 7/2007 | Caldera et al. | |
| 2008/0307269 A1* | 12/2008 | Bennett | G06F 11/079 714/47.2 |
| 2010/0185961 A1* | 7/2010 | Fisher | G06F 11/324 715/760 |
| 2012/0102145 A1* | 4/2012 | Jung | G06F 16/48 709/217 |
| 2012/0210236 A1* | 8/2012 | Prasad | G06F 11/3604 715/738 |
| 2013/0061097 A1* | 3/2013 | Mendel | G06F 21/54 714/47.1 |
| 2014/0324891 A1 | 10/2014 | Kim et al. | |
| 2015/0212920 A1* | 7/2015 | Kraus | G06F 11/3466 717/127 |
| 2016/0034334 A1* | 2/2016 | Sadovsky | G06F 11/0772 714/57 |
| 2016/0098337 A1* | 4/2016 | Ekambaram | G06F 11/3409 719/318 |
| 2016/0350173 A1* | 12/2016 | Ahad | G06F 11/3495 |

OTHER PUBLICATIONS

Extended European Search Report dated Mar. 7, 2018 in European Patent Application No. 17197823.2, 15 pages.

* cited by examiner

METHOD AND DEVICE FOR EVALUATING SYSTEM FLUENCY, AND UE

CROSS-REFERENCE TO RELATED APPLICATIONS

This application is based on and claims priority to Chinese Patent Application No. 201610959975.6 filed on Oct. 27, 2016, the entire contents of which are incorporated herein by reference.

TECHNICAL FIELD

The present disclosure generally relates to the field of User Equipment (UE) technology, and in particular to a method and device for evaluating system fluency, and a UE.

BACKGROUND

With development of UE technology, a user increasingly values fluency of a UE system. Fluency indicates not only hardware capability of equipment, but also stability of a system, a level of system resource management, and capability to control a malicious application as well as a poor quality applications of a third party. In terms of user usage, high system fluency means fast application startup, low lag, and fast inter-app switching times in the system.

In related art, when a system of a UE is evaluated, generally only stability of the system is evaluated. The fluency of the system is not evaluated.

Therefore, there is a pressing need for evaluating system fluency in real-time to determine real capability and endurance of the system to facilitate selecting a UE by a user and determining a system software and/or hardware issues thereof.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for evaluating system fluency. The method includes monitoring an operational state of a service in a serialized scenario on a system, wherein the serialized scenario simulates a usage habit of a user, and includes at least one third-party application; detecting at least one abnormality during the operational state of the service; determining a number of occurrences of each one of the detected abnormalities; and computing a fluency score of the system based on the number of occurrences of each one of the detected abnormalities.

Before monitoring the operational state of the service, the method includes installing a plurality of third-party applications, wherein each of the plurality of third-party applications is ranked among top N third-party applications, N being a positive integer; and launching the service in each serialized scenario in the system.

When detecting the abnormality during the operational state of the service, the method includes determining a frame-loss rate during an operation of the third-party application based on a switch time of the third-party application, an exit time of the third-party application, and a startup time of the third-party application; and determining a frame-loss abnormality of the service based on the startup time of the third-party application, the exit time of the third-party application, the switch time of the third-party application, and the frame-loss rate.

When detecting the abnormality during the operational state of the service, the method includes acquiring a residual state of memory recycling and a number of occurrences of low memory recycling during the operational state; and determining a memory abnormality according to the number of occurrences of the low memory recycling and the residual state of memory recycling.

When detecting the abnormality during the operational state of the service, the method includes acquiring information on a checkpoint during the operational state, wherein the information on the checkpoint affects a performance experience of the user; and determining a checkpoint abnormality based on the information on the checkpoint.

When computing the fluency score of the system based on the number of occurrences of each one of the detected abnormalities, the method includes computing the fluency score of the system by computing a weighted sum of the number of occurrences of each one of the detected abnormalities using a preset weight of each one of the detected abnormalities.

After computing the fluency score of the system, the method includes determining and displaying a diagram of system fluency based on each one of the detected abnormalities, the number of occurrences of each one of the abnormalities, and the fluency score of the system.

Aspects of the disclosure also provide a user equipment including a processor and a memory for storing instructions executable by the processor. The processor is configured to monitor an operational state of a service in a serialized scenario on a system, wherein the serialized scenario simulates a usage habit of a user, and includes at least one third-party application; detect at least one abnormality during the operational state of the service; determine a number of occurrences of each one of the detected abnormalities; and compute a fluency score of the system based on the number of occurrences of each one of the detected abnormalities.

Aspects of the disclosure also provide a non-transitory computer-readable storage medium having stored therein instructions that, when executed by one or more processors, cause the one or more processors to monitor an operational state of a service in a serialized scenario on a system, wherein the serialized scenario simulates a usage habit of a user, and includes at least one third-party application; detect at least one abnormality during the operational state of the service; determine a number of occurrences of each one of the detected abnormalities; and compute a fluency score of the system based on the number of occurrences of each one of the detected abnormalities.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the present disclosure, and together with the description, serve to explain principles of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

A term used in an aspect herein is merely for describing the aspect instead of limiting the present disclosure. A singular form "a" and "the" used in an aspect herein and the appended claims may also be intended to include a plural form, unless clearly indicated otherwise by context. Further note that a term "and/or" used herein may refer to and contain any combination or all possible combinations of one or more associated listed items.

Note that although a term such as first, second, third may be adopted in an aspect herein to describe various kinds of information, such information should not be limited to such a term. Such a term is merely for distinguishing information of the same type. For example, without departing from the scope of the aspects herein, the first information may also be referred to as the second information. Similarly, the second information may also be referred to as the first information. Depending on the context, a "if" as used herein may be interpreted as "when" or "while" or "in response to determining that".

In addition, described characteristics, structures or features may be combined in one or more implementation modes in any proper manner. In the following descriptions, many details are provided to allow a full understanding of aspects herein. However, those skilled in the art will know that the technical solutions of aspects herein may be carried out without one or more of the details; alternatively, another method, component, device, step, etc. may be adopted. Under other conditions, no detail of a known structure, method, device, implementation, material or operation may be shown or described to avoid obscuring aspects of aspects herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

Figure 1:
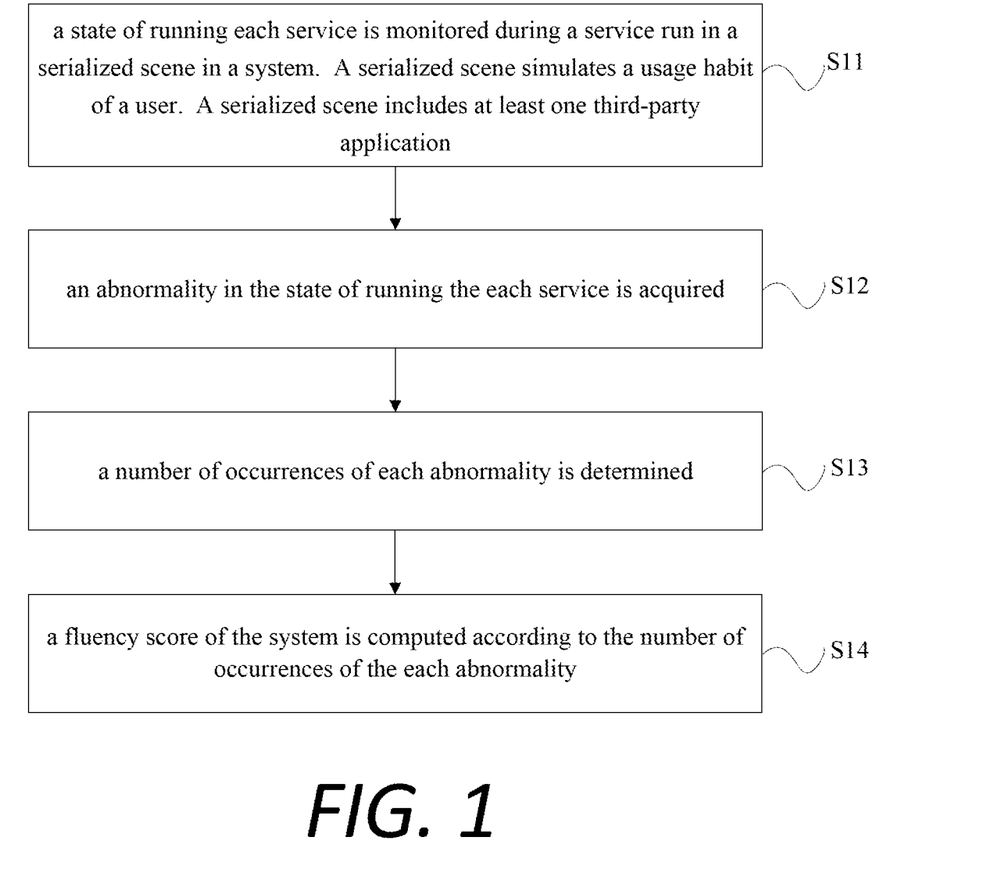
FIG. 1 is a flowchart of a method for evaluating system fluency according to an exemplary first aspect of the present disclosure.

FIG. 1 is a flowchart of a method for evaluating system fluency according to an exemplary first aspect herein. As shown in FIG. 1, the method for evaluating system fluency applies to a UE (namely, a terminal). The UE may include a mobile UE, a personal UE, etc., such as a mobile phone with a touch screen, a tablet computer, a personal computer, etc. The method includes steps as follows.

In Step S11, a state of running each service is monitored during a service run in a serialized scene in a system. A serialized scene simulates a usage habit of a user. A serialized scene includes at least one third-party application.

In the step, there may be various serialized scenes in the system of the UE. A serialized scene may have a preset sequence. A serialized scene simulates a usage habit of a user. Each serialized scene may include at least one third-party application. A state of running each service may be monitored in real time during a service run in a serialized scene in the system.

In Step S12, an abnormality in the state of running the each service is acquired.

Step S12 may be implemented in at least one of three modes as follows.

In a first mode, a frame-loss rate during a third-party application run may be determined according to a third-party application switch time, a third-party application exit time, and a third-party application startup time corresponding to a light service in the system. A frame-loss abnormality of the light service may be determined according to the third-party application startup time, the third-party application exit time, the third-party application switch time, and the frame-loss rate.

In a second mode, a residual state of memory recycling and a number of occurrences of low memory recycling in a light service in the system may be acquired. A memory abnormality may be determined according to the number of occurrences of low memory recycling and the residual state of memory recycling.

In a third mode, information on a checkpoint in a light service in the system may be acquired. The information on the checkpoint may affect a performance experience of the user. A checkpoint abnormality of the light service may be determined according to the information on the checkpoint.

In the step, an abnormality in the state of running each service may be acquired while the state of running the each service is being monitored.

The third-party application switch time, the third-party application exit time, and the third-party application startup time corresponding to the light service in the system may be determined. The frame-loss rate during the third-party application run may then be measured according to the third-party application startup time, the third-party application exit time, and the third-party application switch time. The frame-loss abnormality of the light service may be determined according to the third-party application startup time, the third-party application exit time, the third-party application switch time, and the frame-loss rate.

The residual state of memory recycling and the number of occurrences of low memory recycling in the light service in the system may be acquired. The memory abnormality may be determined according to the number of occurrences of low memory recycling and the residual state of memory recycling.

The information on the checkpoint in the light service in the system may be acquired. The information on the checkpoint may affect the performance experience of the user. The checkpoint abnormality of the light service may be determined according to the information on the checkpoint.

In Step S13, a number of occurrences of each abnormality is determined.

In the step, after a set serialized scene run completes, occurrences of an abnormality may be counted. For example, occurrences of no-system-response abnormality and occurrences of upper-layer-watchdog-service exit abnormality may be determined.

In Step S14, a fluency score of the system is computed according to the number of occurrences of the each abnormality.

Step S14 may be implemented as follows.

The fluency score of the system may be computed by computing a weighted sum of the number of occurrences of the each abnormality using a preset weight of the each abnormality.

In the step, the fluency score of the system may be computed according to the number of occurrences of the each abnormality. An abnormality may correspond to a preset weight, in terms of importance, and a quantified difference. Weighted summation may be performed using the preset weight of the each abnormality, the quantified difference of the each abnormality, and the number of occurrences of the each abnormality, to acquire the fluency score of the system.

For example, the fluency score of the system may be acquired by performing weighted summation using preset weights, quantified differences, and numbers of occurrences of app-use abnormality, frame-loss-rate abnormality, memory-use abnormality, etc.

According to the aspect, a state of running each service is monitored during a service run in a serialized scene in a system. A serialized scene simulates a usage habit of a user. A serialized scene includes at least one third-party application. An abnormality in the state of running the each service is acquired. A number of occurrences of each abnormality is determined. A fluency score of the system is computed according to the number of occurrences of the each abnormality. In such a manner, a scene is monitored from the perspective of the user to obtain a quantitative measurement. An assessing index is acquired with respect to a key factor impacting the respective scene, such as memory, storage, system resource switch, abnormality processing, etc., to provide a fluency score of a UE with a certain configuration and release. The fluency score may facilitate determining real capability and endurance of system fluency, as well as selecting a UE by a user and discovering a downside of a software and/or hardware release.

Figure 2:
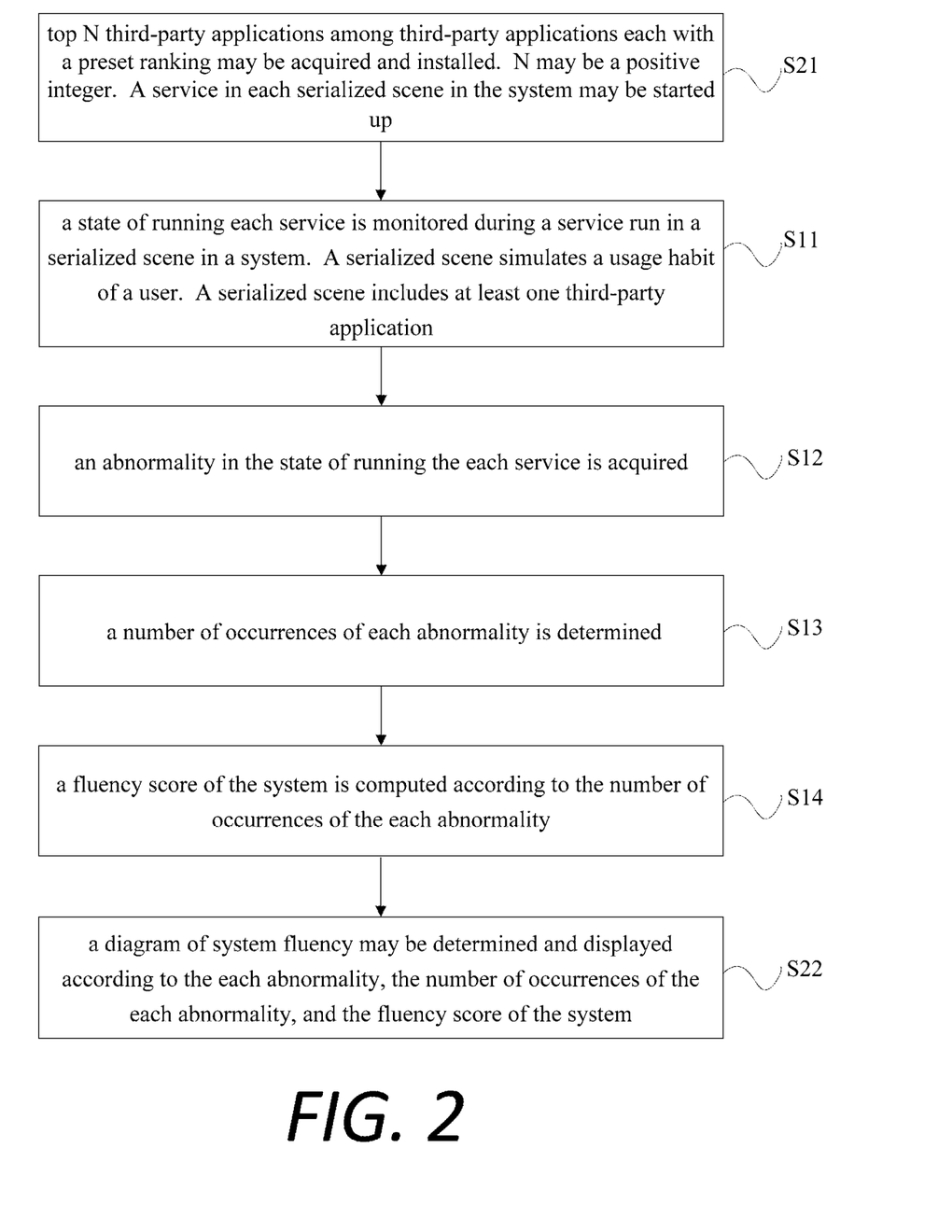
FIG. 2 is a flowchart of a method for evaluating system fluency according to an exemplary second aspect of the present disclosure.

FIG. 2 is a flowchart of a method for evaluating system fluency according to an exemplary second aspect herein, based on the aspect shown in FIG. 1. As shown in FIG. 2, the method may further include, before Step S11, a step as follows.

In Step S21, top N third-party applications among third-party applications each with a preset ranking may be acquired and installed. N may be a positive integer. A service in each serialized scene in the system may be started up.

In the step, each third-party application may have a preset ranking. A third-party application to be acquired may be from top N third-party applications. N may be a positive integer. Thus, an acquired third-party application may be one of a most popular type. An acquired third-party application may then be installed in the system of the UE.

The method may further include, after Step S14, a step as follows.

In Step S22, a diagram of system fluency may be determined and displayed according to the each abnormality, the number of occurrences of the each abnormality, and the fluency score of the system.

In the step, a diagram of system fluency may be determined according to the acquired each abnormality, the acquired number of occurrences of the each abnormality, and the computed fluency score of the system. The diagram of system fluency may include the each abnormality, the number of occurrences of the each abnormality, and the computed fluency score of the system. The diagram of system fluency may then be displayed before the user.

According to the aspect, a state of running each service is monitored during a service run in a serialized scene in a system. A serialized scene simulates a usage habit of a user. A serialized scene includes at least one third-party application. An abnormality in the state of running the each service is acquired. A number of occurrences of each abnormality is determined. A fluency score of the system is computed according to the number of occurrences of the each abnormality. A diagram of system fluency may be determined and displayed according to the each abnormality, the number of occurrences of the each abnormality, and the fluency score of the system. In such a manner, a scene is monitored from the perspective of the user to obtain a quantitative measurement. An assessing index is acquired with respect to a key factor impacting the respective scene, such as memory, storage, system resource switch, abnormality processing, etc., to provide a fluency score of a UE with a certain configuration and release. The fluency score may facilitate determining real capability and endurance of system fluency, as well as selecting a UE by a user and discovering a downside of a software and/or hardware release.

Corresponding to an aforementioned method for evaluating system fluency according to an aspect herein, an aspect herein further provides a device for evaluating system fluency.

Figure 3:
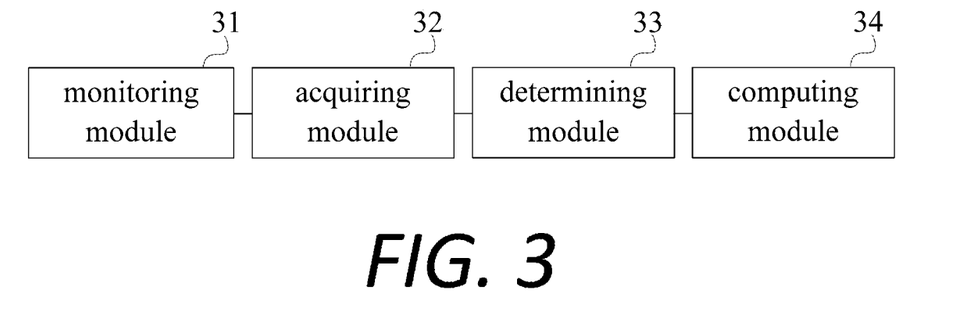
FIG. 3 is a block diagram of a device for evaluating system fluency according to an exemplary third aspect of the present disclosure.

FIG. 3 is a block diagram of a device for evaluating system fluency according to an exemplary third aspect herein. Referring to FIG. 3, the device includes a monitoring module 31, an acquiring module 32, a determining module 33, and a computing module 34.

The monitoring module 31 is configured for monitoring, during a service run in a serialized scene in a system, a state of running each service. A serialized scene simulates a usage habit of a user. A serialized scene includes at least one third-party application.

The acquiring module 32 is configured for acquiring an abnormality in the state of running the each service.

The determining module 33 is configured for determining a number of occurrences of each abnormality.

The computing module 34 is configured for computing a fluency score of the system according to the number of occurrences of the each abnormality.

The acquiring module 32 may be configured for determining a frame-loss rate during a third-party application run according to a third-party application switch time, a third-party application exit time, and a third-party application startup time corresponding to a light service in the system.

The acquiring module 32 may be configured for determining a frame-loss abnormality of the light service according to the third-party application startup time, the third-party application exit time, the third-party application switch time, and the frame-loss rate.

The acquiring module 32 may be configured for acquiring a residual state of memory recycling and a number of occurrences of low memory recycling in a light service in the system.

The acquiring module 32 may be configured for determining a memory abnormality according to the number of occurrences of low memory recycling and the residual state of memory recycling.

The acquiring module 32 may be configured for acquiring information on a checkpoint in a light service in the system. The information on the checkpoint may affect a performance experience of the user.

The acquiring module 32 may be configured for determining a checkpoint abnormality of the light service according to the information on the checkpoint.

The computing module 34 may be configured for computing the fluency score of the system by computing a weighted sum of the number of occurrences of the each abnormality using a preset weight of the each abnormality.

A module of the device according to the aspect may execute an operation in a mode elaborated in an aspect of the method, which will not be repeated here.

According to the aspect, a state of running each service is monitored during a service run in a serialized scene in a system. A serialized scene simulates a usage habit of a user. A serialized scene includes at least one third-party application. An abnormality in the state of running the each service is acquired. A number of occurrences of each abnormality is determined. A fluency score of the system is computed according to the number of occurrences of the each abnormality. In such a manner, a scene is monitored from the perspective of the user to obtain a quantitative measurement. An assessing index is acquired with respect to a key factor impacting the respective scene, such as memory, storage, system resource switch, abnormality processing, etc., to provide a fluency score of a UE with a certain configuration and release. The fluency score may facilitate determining real capability and endurance of system fluency, as well as selecting a UE by a user and discovering a downside of a software and/or hardware release.

Figure 4:
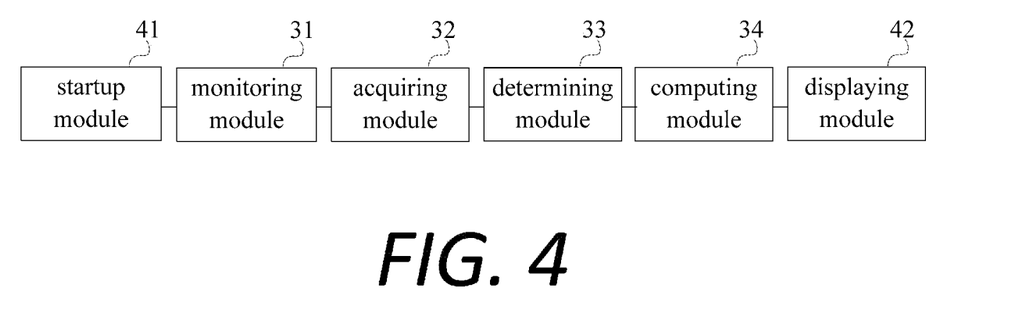
FIG. 4 is a block diagram of a device for evaluating system fluency according to an exemplary fourth aspect of the present disclosure.

FIG. 4 is block diagram of a device for evaluating system fluency according to an exemplary fourth aspect herein, based on the aspect shown in FIG. 3. As shown in FIG. 4, the device may further include a startup module 41 and/or a displaying module 42.

The startup module 41 may be configured for acquiring and installing a third-party application before the monitoring module 31 monitors the state of running the each service. Each third-party application may have a preset ranking. The third-party application to be acquired may be from top N third-party applications according to rankings thereof. N may be a positive integer.

The startup module 41 may be configured for starting up a service in each serialized scene in the system.

The displaying module 42 may be configured for, after the computing module 34 has computed the fluency score of the system according to the number of occurrences of the each abnormality, determining and displaying a diagram of system fluency according to the each abnormality, the number of occurrences of the each abnormality, and the fluency score of the system.

A module of the device according to the aspect may execute an operation in a mode elaborated in an aspect of the method, which will not be repeated here.

According to the aspect, a state of running each service is monitored during a service run in a serialized scene in a system. A serialized scene simulates a usage habit of a user. A serialized scene includes at least one third-party application. An abnormality in the state of running the each service is acquired. A number of occurrences of each abnormality is determined. A fluency score of the system is computed according to the number of occurrences of the each abnormality. A diagram of system fluency may be determined and displayed according to the each abnormality, the number of occurrences of the each abnormality, and the fluency score of the system. In such a manner, a scene is monitored from the perspective of the user to obtain a quantitative measurement. An assessing index is acquired with respect to a key factor impacting the respective scene, such as memory, storage, system resource switch, abnormality processing, etc., to provide a fluency score of a UE with a certain configuration and release. The fluency score may facilitate determining real capability and endurance of system fluency, as well as selecting a UE by a user and discovering a downside of a software and/or hardware release.

Figure 5:
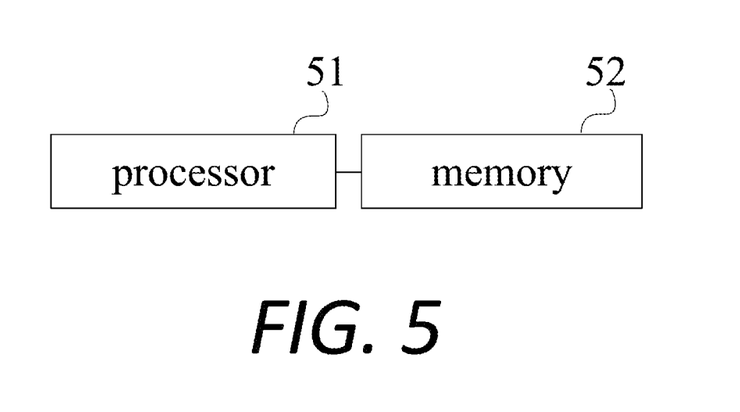
FIG. 5 is a block diagram of a UE according to an exemplary aspect of the present disclosure.

FIG. 5 is a block diagram of a UE according to an exemplary aspect herein. Referring to FIG. 5, the UE includes a processor 51 and a memory 52 for storing instructions executable by the processor.

The processor 51 is configured for monitoring, during a service run in a serialized scene in a system, a state of running each service. A serialized scene simulates a usage habit of a user. A serialized scene includes at least one third-party application. The processor is configured for acquiring an abnormality in the state of running the each service. The processor is configured for determining a number of occurrences of each abnormality. The processor is configured for computing a fluency score of the system according to the number of occurrences of the each abnormality.

Note that in an aforementioned aspect, the processor may be a Central Processing Unit (CPU), a general purpose processor, a Digital Signal Processor (DSP), an Application Specific Integrated Circuit (ASIC), and/or the like. A general purpose processor may be a microprocessor, any conventional processor, and/or the like. An aforementioned memory may be a Read-Only Memory (ROM), a Random Access Memory (RAM), a flash memory, a hard disk, a solid state disk, and/or the like. A Subscriber Identity Module (SIM) card, also referred to as a smart card, has to be installed on a digital mobile phone before the phone can be used. Content, such as information on a user of the digital mobile phone, an encryption key, a phonebook of the user, may be stored on the computer chip. A step of the method according to any combination of aspects herein may be executed by a hardware processor, or by a combination of hardware and software modules in the processor.

A module of the UE according to the above aspect may execute an operation in a mode elaborated in aspects of the method and device, which will not be repeated here.

According to the aspect, a state of running each service is monitored during a service run in a serialized scene in a system. A serialized scene simulates a usage habit of a user. A serialized scene includes at least one third-party application. An abnormality in the state of running the each service is acquired. A number of occurrences of each abnormality is determined. A fluency score of the system is computed according to the number of occurrences of the each abnormality. In such a manner, a scene is monitored from the perspective of the user to obtain a quantitative measurement. An assessing index is acquired with respect to a key factor impacting the respective scene, such as memory, storage, system resource switch, abnormality processing, etc., to provide a fluency score of a UE with a certain configuration and release. The fluency score may facilitate determining real capability and endurance of system fluency, as well as selecting a UE by a user and discovering a downside of a software and/or hardware release.

Figure 6:
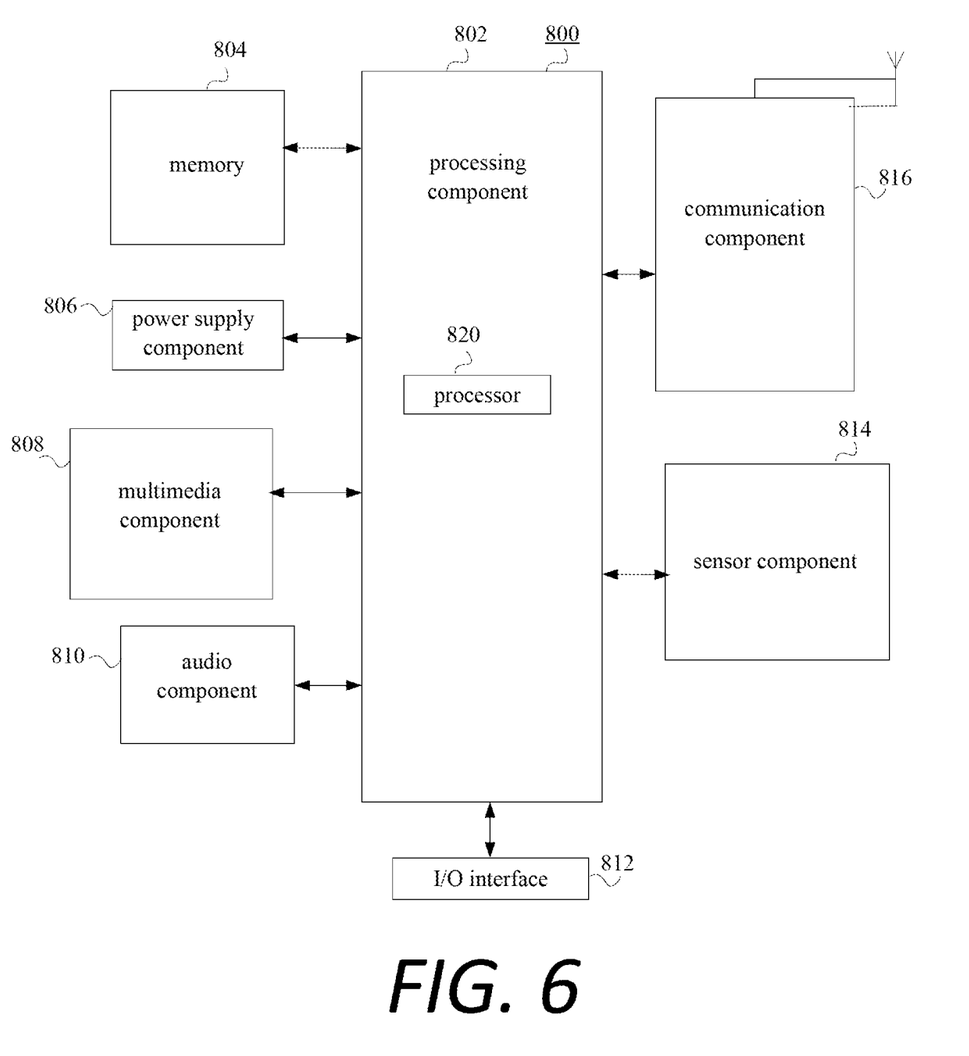
FIG. 6 is a block diagram of a UE according to an exemplary aspect of the present disclosure.

FIG. 6 is a block diagram of a UE 800 according to an exemplary aspect. For example, the UE 800 may be a mobile phone, a computer, a digital broadcasting terminal or UE, a message transceiver, a game console, tablet equipment, medical equipment, fitness equipment, a personal digital assistant, and/or the like.

Referring to FIG. 6, the UE 800 may include one or more components as follows: a processing component 802, a memory 804, a power supply component 806, a multimedia component 808, an audio component 810, an Input/Output (I/O) interface 812, a sensor component 814, and a communication component 816.

The processing component 802 generally controls an overall operation of the UE 800, such as operations associated with display, a telephone call, data communication, a camera operation, and a recording operation. The processing component 802 may include one or more processors 820 to execute instructions so as to complete all or some steps of the method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 may be configured to store various types of data to support the operation at the UE 800. Example of such data may include instructions of any application or method configured to operate on the UE 800, contact data, phonebook data, messages, pictures, videos, and/or the like. The memory 804 may be realized by any type of transitory or non-transitory storage equipment or combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk, or compact disk.

The power supply component 806 may supply electric power to various components of the UE 800. The power supply component 806 may include a power management system, one or more power sources, and other components related to generating, managing and distributing electricity for the UE 800.

The multimedia component 808 may include a screen providing an output interface between the UE 800 and a user. In some aspects, the screen may include a Liquid Crystal Display (LCD) and a Touch Panel (TP). If the screen includes a TP, the screen may be realized as a touch screen to receive an input signal from a user. The TP may include one or more touch sensors for sensing touch, slide and gestures on the TP. The touch sensors not only may sense the boundary of a touch or slide move, but also detect the duration and pressure related to the touch or slide move. In some aspects, the multimedia component 808 may include a front camera and/or a rear camera. When the UE 800 is in an operation mode such as a shooting mode or a video mode, the front camera and/or the rear camera may receive external multimedia data. Each of the front camera and the rear camera may be a fixed optical lens system or may have a focal length and be capable of optical zooming.

The audio component 810 may be configured to output and/or input an audio signal. For example, the audio component 810 may include a microphone (MIC). When the UE 800 is in an operation mode such as a call mode, a recording mode, and a voice recognition mode, the MIC may be configured to receive an external audio signal. The received audio signal may be further stored in the memory 804 or may be sent via the communication component 816. In some aspects, the audio component 810 may further include a loudspeaker configured to output the audio signal.

The I/O interface 812 may provide an interface between the processing component 802 and a peripheral interface module. Such a peripheral interface module may be a keypad, a click wheel, a button, and/or the like. Such a button may include but is not limited to at least one of: a homepage button, a volume button, a start button, and a lock button.

The sensor component 814 may include one or more sensors for assessing various states of the UE 800. For example, the sensor component 814 may detect an on/off state of the UE 800 and relative positioning of components such as the display and the keypad of the UE 800. The sensor component 814 may further detect a change in the position of the UE 800 or of a component of the UE 800, whether there is contact between the UE 800 and a user, the orientation or acceleration/deceleration of the UE 800, and/or a change in the temperature of the UE 800. The sensor component 814 may include a proximity sensor configured to detect existence of a nearby object without physical contact. The sensor component 814 may further include an optical sensor such as a Complementary Metal-Oxide-Semiconductor (CMOS) or Charge-Coupled-Device (CCD) image sensor used in an imaging application. In some aspects, the sensor component 814 may further include an acceleration sensor, a gyroscope sensor, a magnetic sensor, a pressure sensor, and/or a temperature sensor.

The communication component 816 may be configured to facilitate wired or wireless communication between the UE 800 and other equipment. The UE 800 may access a wireless network based on a communication standard such as WiFi, 2G or 3G, or combination thereof. In an exemplary aspect, the communication component 816 may receive a broadcast signal or broadcast related information from an external broadcast management system via a broadcast channel. In an exemplary aspect, the communication component 816 may further include a Near Field Communication (NFC) module for short-range communication. For example, the NFC module may be based on Radio Frequency Identification (RFID), Infrared Data Association (IrDA), Ultra-Wideband (UWB) technology, Bluetooth (BT), and/or other technologies.

In an exemplary aspect, the UE 800 may be realized by one or more of Application Specific Integrated Circuits (ASIC), Digital Signal Processors (DSP), Digital Signal Processing Device (DSPD), Programmable Logic Devices (PLD), Field Programmable Gate Arrays (FPGA), controllers, microcontrollers, microprocessors and/or other electronic components, to implement the method.

In an exemplary aspect, a non-transitory computer-readable storage medium including instructions, such as a memory 804 including instructions, may be provided. The instructions may be executed by the processor 820 of the UE 800 to implement the method. For example, the non-transitory computer-readable storage medium may be a Read-Only Memory (ROM), a Compact Disc Read-Only Memory (CD-ROM), a magnetic tape, a floppy disk, optical data storage equipment, and/or the like.

A non-transitory computer-readable storage medium includes instructions which when executed by a processor of a UE (such as a mobile UE), enable the UE to execute a method for evaluating system fluency. The method includes:

monitoring, during a service run in a serialized scene in a system, a state of running each service, wherein a serialized scene simulates a usage habit of a user, and comprises at least one third-party application;

acquiring an abnormality in the state of running the each service;

determining a number of occurrences of each abnormality; and computing a fluency score of the system according to the number of occurrences of the each abnormality.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects herein will be apparent to those skilled in the art from consideration of the specification and practice of the disclosure disclosed here. This application is intended to cover any variation, use, or adaptation of the present disclosure following the general principle herein and including such departures from the present disclosure as come within known or customary practice in the art. The present disclosure and its aspects are intended to be exemplary only, with a true scope and spirit of the present disclosure being indicated by the appended claims.

It will be appreciated that the present disclosure is not limited to the exact construction that has been described above and illustrated in the accompanying drawings, and that various modifications and changes can be made without departing from the scope thereof. It is intended that the scope of the present disclosure be limited only by the appended claims.

The invention claimed is:

1. A method for evaluating system fluency, comprising:
   monitoring an operational state of a service in a serialized scenario on a system, wherein the serialized scenario simulates a usage habit of a user, and includes at least one third-party application;
   detecting at least one abnormality during the operational state of the service;
   determining a number of occurrences of each one of the detected abnormalities; and
   computing a fluency score of the system based on the number of occurrences of each one of the detected abnormalities,
   wherein detecting the abnormality during the operational state of the service comprises:
      determining a frame-loss rate during an operation of the third-party application based on a switch time of the third-party application, an exit time of the third-party application, and a startup time of the third-party application; and
      determining a frame-loss abnormality of the service based on the startup time of the third-party application, the exit time of the third-party application, the switch time of the third-party application, and the frame-loss rate.

2. The method of claim 1, wherein, before monitoring the operational state of the service, the method comprises:
   installing a plurality of third-party applications, wherein each of the plurality of third-party applications is ranked among top N third-party applications, N being a positive integer; and
   launching the service in each serialized scenario in the system.

3. The method of claim 1, wherein detecting the abnormality during the operational state of the service comprises:
   acquiring a residual state of memory recycling and a number of occurrences of low memory recycling during the operational state; and
   determining a memory abnormality according to the number of occurrences of the low memory recycling and the residual state of memory recycling.

4. The method of claim 1, wherein detecting the abnormality during the operational state of the service comprises:
   acquiring information on a checkpoint during the operational state, wherein the information on the checkpoint affects a performance experience of the user; and
   determining a checkpoint abnormality based on the information on the checkpoint.

5. The method of claim 1, wherein computing the fluency score of the system based on the number of occurrences of each one of the detected abnormalities comprises:
   computing the fluency score of the system by computing a weighted sum of the number of occurrences of each one of the detected abnormalities using a preset weight of each one of the detected abnormalities.

6. The method of claim 1, wherein, after computing the fluency score of the system, the method further comprises:
   determining and displaying a diagram of system fluency based on each one of the detected abnormalities, the number of occurrences of each one of the abnormalities, and the fluency score of the system.

7. A user equipment, comprising:
   a processor; and
   a memory for storing instructions executable by the processor,
   wherein the processor is configured to:
      monitor an operational state of a service in a serialized scenario on a system, wherein the serialized scenario simulates a usage habit of a user, and includes at least one third-party application;
      detect at least one abnormality during the operational state of the service;
      determine a number of occurrences of each one of the detected abnormalities; and
      compute a fluency score of the system based on the number of occurrences of each one of the detected abnormalities,
   wherein, when detecting the abnormality during the operational state of the service, the processor is further configured to:
      determine a frame-loss rate during an operation of the third-party application based on a switch time of the third-party application, an exit time of the third-party application, and a startup time of the third-party application; and
      determine a frame-loss abnormality of the service based on the startup time of the third-party application, the exit time of the third-party application, the switch time of the third-party application, and the frame-loss rate.

8. The user equipment of claim 7, wherein, before monitoring the operational state of the service, the processor is further configured to:
   install a plurality of third-party applications, wherein each of the plurality of third-party applications is ranked among top N third-party applications, N being a positive integer; and launch the service in each serialized scenario in the system.

9. The user equipment of claim 7, wherein, when detecting the abnormality during the operational state of the service, the processor is further configured to:
   acquire a residual state of memory recycling and a number of occurrences of low memory recycling during the operational state; and
   determine a memory abnormality according to the number of occurrences of the low memory recycling and the residual state of memory recycling.

10. The user equipment of claim 7, wherein, when detecting the abnormality during the operational state of the service, the processor is further configured to:
    acquire information on a checkpoint during the operational state wherein the information on the checkpoint affects a performance experience of the user; and
    determine a checkpoint abnormality based on the information on the checkpoint.

11. The user equipment of claim 7, wherein, when computing the fluency score of the system based on the number of occurrences of each one of the detected abnormalities, the processor is further configured to:
    compute the fluency score of the system by computing a weighted sum of the number of occurrences of each one of the detected abnormalities using a preset weight of each one of the detected abnormalities.

12. The user equipment of claim 7, wherein, after computing the fluency score of the system, the processor is further configured to:
    determine and display a diagram of system fluency based on each one of the detected abnormalities, the number of occurrences of each one of the abnormalities, and the fluency score of the system.

13. A non-transitory computer-readable storage medium having stored therein instructions that, when executed by one or more processors, cause the one or more processors to:
    monitor an operational state of a service in a serialized scenario on a system, wherein the serialized scenario simulates a usage habit of a user, and includes at least one third-party application;
    detect at least one abnormality during the operational state of the service;
    determine a number of occurrences of each one of the detected abnormalities; and
    compute a fluency score of the system based on the number of occurrences of each one of the detected abnormalities,
    wherein, when detecting the abnormality during the operational state of the service, the instructions further cause the one or more processors to:
        determine a frame-loss rate during an operation of the third-party application based on a switch time of the third-party application, an exit time of the third-party application, and a startup time of the third-party application; and
        determine a frame-loss abnormality of the service based on the startup time of the third-party application, the exit time of the third-party application, the switch time of the third-party application, and the frame-loss rate.

14. The non-transitory computer-readable storage medium of claim 13, wherein, before monitoring the operational state of the service, the instructions cause the one or more processors to:
    install a plurality of third-party applications, wherein each of the plurality of third-party applications is ranked among top N third-party applications, N being a positive integer; and
    launch the service in each serialized scenario in the system.

15. The non-transitory computer-readable storage medium of claim 13, wherein, when detecting the abnormality during the operational state of the service, the instructions cause the one or more processors to:
    acquire a residual state of memory recycling and a number of occurrences of low memory recycling during the operational state; and
    determine a memory abnormality according to the number of occurrences of the low memory recycling and the residual state of memory recycling.

16. The non-transitory computer-readable storage medium of claim 13, wherein, when detecting the abnormality during the operational state of the service, the instructions cause the one or more processors to:
    acquire information on a checkpoint during the operational state, wherein the information on the checkpoint affects a performance experience of the user; and
    determine a checkpoint abnormality based on the information on the checkpoint.

17. The non-transitory computer-readable storage medium of claim 13, wherein, when computing the fluency score of the system based on the number of occurrences of each one of the detected abnormalities, the instructions cause the one or more processors to:
    compute the fluency score of the system by computing a weighted sum of the number of occurrences of each one of the detected abnormalities using a preset weight of each one of the detected abnormalities.

18. A method for evaluating system fluency, comprising:
    monitoring an operational state of a service in a serialized scenario on a system, wherein the serialized scenario simulates a usage habit of a user, and includes at least one third-party application;
    detecting at least one abnormality during the operational state of the service;
    determining a number of occurrences of each one of the detected abnormalities; and
    computing a fluency score of the system based on the number of occurrences of each one of the detected abnormalities,
    wherein detecting the abnormality during the operational state of the service comprises:
        acquiring a residual state of memory recycling and a number of occurrences of low memory recycling during the operational state; and
        determining a memory abnormality according to the number of occurrences of the low memory recycling and the residual state of memory recycling.

19. A user equipment, comprising:
    a processor; and
    a memory for storing instructions executable by the processor,
    wherein the processor is configured to:
        monitor an operational state of a service in a serialized scenario on a system, wherein the serialized scenario simulates a usage habit of a user, and includes at least one third-party application;
        detect at least one abnormality during the operational state of the service;
        determine a number of occurrences of each one of the detected abnormalities; and compute a fluency score of the system based on the number of occurrences of each one of the detected abnormalities, wherein, when detecting the abnormality during the operational state of the service, the processor is further configured to:
acquire a residual state of memory recycling and a number of occurrences of low memory recycling during the operational state; and
determine a memory abnormality according to the number of occurrences of the low memory recycling and the residual state of memory recycling.

20. A non-transitory computer-readable storage medium having stored therein instructions that, when executed by one or more processors, cause the one or more processors to:
monitor an operational state of a service in a serialized scenario on a system, wherein the serialized scenario simulates a usage habit of a user, and includes at least one third-party application;
detect at least one abnormality during the operational state of the service;
determine a number of occurrences of each one of the detected abnormalities; and
compute a fluency score of the system based on the number of occurrences of each one of the detected abnormalities, wherein, when detecting the abnormality during the operational state of the service, the instructions cause the one or more processors to:
acquire a residual state of memory recycling and a number of occurrences of low memory recycling during the operational state; and
determine a memory abnormality according to the number of occurrences of the low memory recycling and the residual state of memory recycling.

* * * * *